March 1, 1966 H. A. FROMSON 3,237,362
STRUCTURAL UNIT FOR SUPPORTING LOADS AND RESISTING STRESSES
Filed July 11, 1961 4 Sheets-Sheet 1
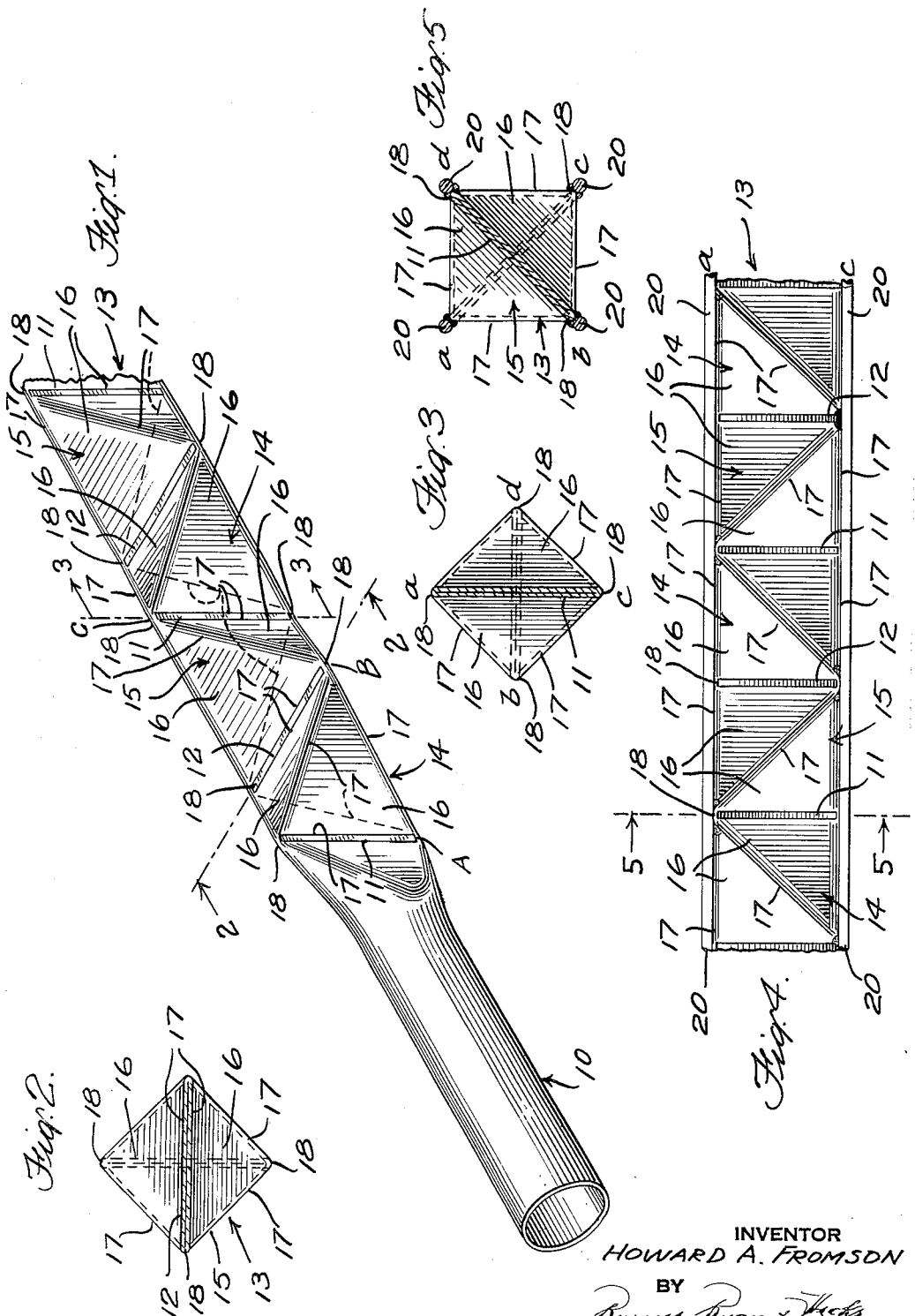
INVENTOR
HOWARD A. FROMSON
BY
Burgess, Ryan & Vicks
ATTORNEYS

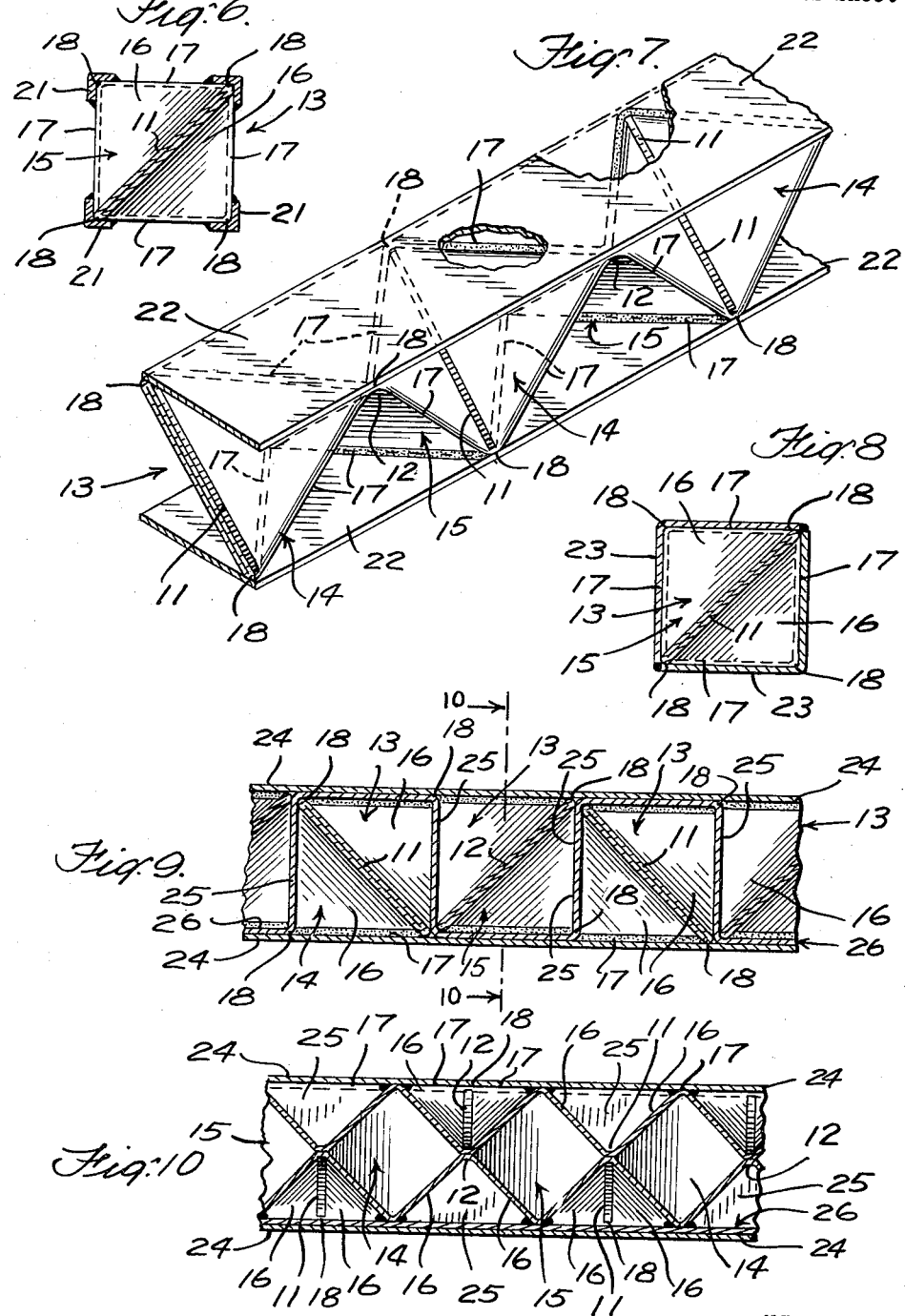

March 1, 1966 H. A. FROMSON 3,237,362
STRUCTURAL UNIT FOR SUPPORTING LOADS AND RESISTING STRESSES
Filed July 11, 1961 4 Sheets-Sheet 3

INVENTOR
HOWARD A. FROMSON
BY
Burgess, Ryan Hicks
ATTORNEYS

March 1, 1966 H. A. FROMSON 3,237,362
STRUCTURAL UNIT FOR SUPPORTING LOADS AND RESISTING STRESSES
Filed July 11, 1961 4 Sheets-Sheet 4
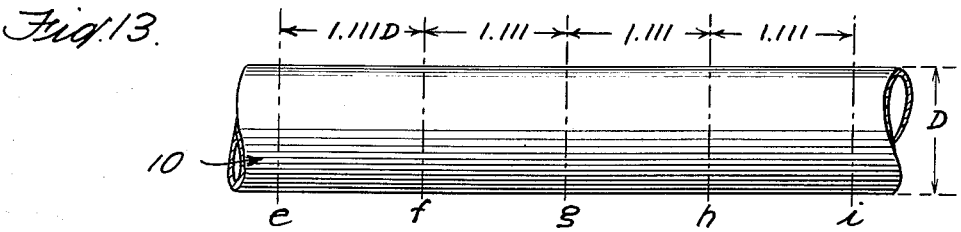
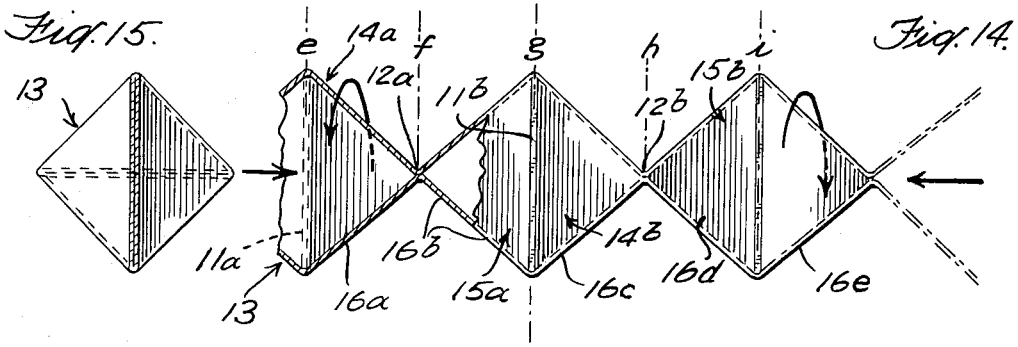
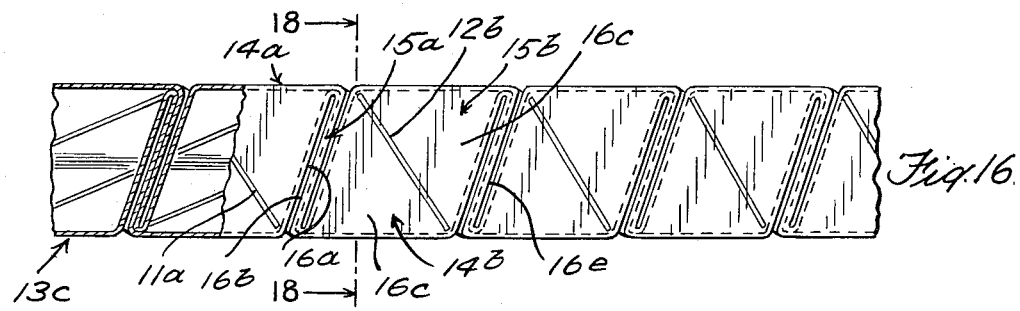
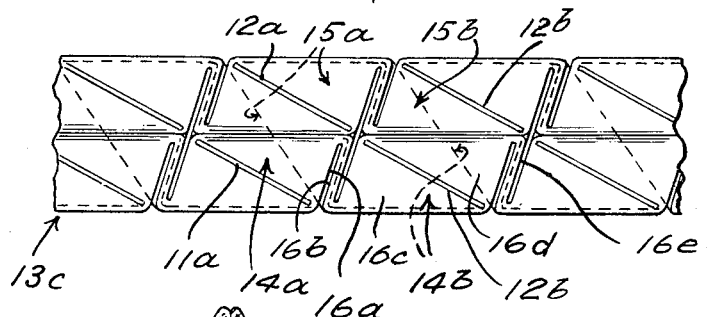
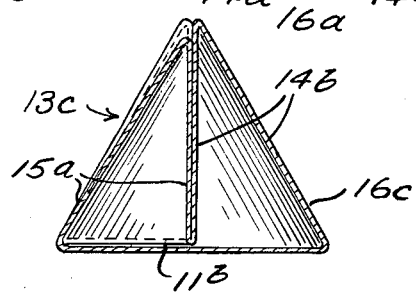
INVENTOR
HOWARD A. FROMSON
BY
Burgess, Ryan & Hicks
ATTORNEYS United States Patent Office 3,237,362
Patented Mar. 1, 1966

3,237,362
STRUCTURAL UNIT FOR SUPPORTING LOADS
AND RESISTING STRESSES
Howard A. Fromson, Rogues Ridge Road, Weston, Conn.
Filed July 11, 1961, Ser. No. 123,967
16 Claims. (Cl. 52—615)

The present invention relates to structural materials.

One object of the present invention is to provide a new and improved structural element which lends itself effectively to use as the core or web of a composite fabricated structure such as a beam, column, stanchion, panel, pontoon, arch, and the like; which is configurated for ready assembly with other structural accessories such as tie rods, angle irons, panel sheets and the like to form fabricated structures of many shapes and sizes for a great variety of structural application; which can be easily bent into intricate angular and curved shapes; which has a geometrical configuration to impart to any construction to which it is applied as a core or web great rigidity and strength causing said construction to withstand most effectively shear, torsion, tension and compression stresses with substantially uniform stress distribution even under the most unsymmetrical loading conditions; which has an unusually high strength to weight ratio; which when incorporated into a structure as part of an assembly causes said structure to partake of the spaced structural characteristics of both a skeleton frame system and of a stressed skin system; which is cellular in construction and therefore is useful in cases where buoyancy might be desired; which lends itself to manufacture by many different types of material such as metal, plastic, or fibrous materials, as for example, paper; which is comparatively inexpensive to manufacture; and which has interesting architectural characteristics.

In accordance with the present invention, the tetrahedron is employed as the basic structural unit of the structural core. To that end, this core consists of a chain of integrally interconnected hollow tetrahedrons formed from a tubular blank of circular cross-section by transversely crimping or collapsing said blank at linear sections spaced therealong by the application of pinching pressures at these sections, successive sections being crimped by pressures acting in parallel planes transverse to the tubular blank but in different directions, and sections at equally spaced intervals greater than that between successive sections being crimped by pressures acting in parallel planes and in parallel directions. This crimping of the tubular blank in the manner described will constrict and substantially close the blank at these sections and will shape the blank into a succession or chain of hollow tetrahedrons integrally joined together along the edges of adjacent tetrahedrons at the crimped sections. Where the tubular blank is crimped in only two directions, the transverse outline of the resulting core as observed in end view will be generally rectangular, and in such cases, where the intervals between crimpings are equal, successive tetrahedrons will be mirror images of each other. Where these two directions are at right angles to each other, the transverse outline of the core as observed in end view will be generally square, and where these two directions are at an angle to each other, other than a right angle, the transverse outline of the core will be generally in the form of an oblong rectangle. This transverse rectangular configuration of the core whether square or oblong, permits a number of these cores to be arranged compactly side by side to form a unitary structure such as a flooring, platform or pontoon.

Where the tubular blank is crimped in more than two directions, the generally transverse outline of the resulting core as observed in end view will be generally in the form of a polygon having more than four sides, the number of sides being double the number of crimping directions employed.

The key to the strength of the structural core or web formed as described is the fact that a tetrahedron has the highest ratio of surface area per unit volume of any polyhedra and is therefore the most stable of all of the polyhedra. This comparatively high surface area imparts to a structure containing this core the highly desirable qualities of a stressed skin system.

A tetrahedron by definition is bounded by four plane triangular faces and has, therefore, six edges and four vertices. Each linear crimped section of the structural core constitutes the two merged edges of adjacent tetrahedrons and the ends of each of these sections define two apices of each of the tetrahedrons, each apex merging with the corresponding apex of the adjacent tetrahedron. With the linear crimped sections arranged as described, there are formed a plurality of parallel rows of apices extending along the core and arranged to encompass a geometric transverse area having four or more sides. With this geometric configuration and with the apices forming nodes in the structural core, it is possible to secure conveniently and stably to these apices along the core, ties in the form of rods, angle irons, strip sheets or panel sheets to produce a structure of generally transverse polygonal outline having four or more sides.

Where ties are arranged along the rows of apices of the core, these ties form chords between successive apices in each row and the resulting structure will be made up of a series of interconnected triangular truss units having the rigidity and stability incident to structural triangulation.

Although the tubular blank of circular cross-section has been collapsed at successive intervals by crimping to form a chain of tetrahedrons, this chain still has a tubular structure partaking of the characteristics of a structural skin system and retains thereby all of the high torsional or twist resistance of a tube. At the same time, it is isotropic in character in the nature of a space system. In such a system, owing to the interconnection of all the members, the applied external loads are distributed in all directions, thus reducing the high stresses in the directly loaded parts.

The tubular blank from which the core of the present invention is formed may have an imperforate wall or where extreme lightness is important, the tubular blank may have a series of perforations in the form of an expanded metal tube.

Various other objects, features and advantages of the invention are apparent from the following description and from inspection of the accompanying drawings, in which FIG. 1 is a perspective view of a tubular blank shown partly crimped in the process of converting it into a structural tetrahedral chain core of square transverse outline in accordance with one embodiment of the present invention;

FIG. 2 is a transverse section of the crimped tubular blank taken along the lines 2—2 of FIG. 1;

FIG. 3 is a transverse section of the crimped tubular blank taken along the lines 3—3 of FIG. 1;

FIG. 4 is a side elevation of a structure comprised of a tetrahedral chain core reinforced with tie rods along the rows of tetrahedral apices in accordance with one embodiment of the present invention;

FIG. 5 is a transverse section of the reinforced core taken along the lines 5—5 of FIG. 5;

FIG. 6 is a transverse section of a tetrahedral chain core reinformed with angle irons along the rows of tetrahedral apices in accordance with another embodiment of the present invention;

FIG. 7 is a perspective of a tetrahedral chain core reinforced by flat flanking panel sheets in accordance with a further embodiment of the present invention;

FIG. 8 is a transverse section of a tetrahedral chain core reinforced by a pair of angle irons conjointly enclosing the core in accordance with a still further embodiment of the present invention;

FIG. 9 is a front elevational section of a composite structure comprising a series of tetrahedral chain cores side by side sandwiched between two reinforcing panel sheets to form a flooring, pontoon, platform or the like in accordance with another embodiment of the present invention;

FIG. 10 is a transverse section of the composite structure of FIG. 9 taken on lines 10—10 of FIG. 9;

FIG. 13 shows a side elevation of a tubular blank with indications of the crimping planes for forming a foldable tetrahedral chain core;

FIG. 14 is a view partly in longitudinal section and partly in side elevation of a foldable tetrahedral chain core made by crimping the tubular blank of FIG. 13 in the planes indicated;

FIG. 15 is an end view of the core shown in FIG. 14;

FIG. 16 is a side elevation of a structural cellular unit made by collapsing the core of FIG. 14 in accordance with another embodiment of the present invention;

FIG. 17 is a top plane view of the structural cellular unit of FIG. 16; and

FIG. 18 is a transverse section of the structural cellular unit of FIG. 16 taken on lines 18—18 of FIG. 16.

Referring to FIGS. 1–3 of the drawings, there is shown an imperforate tubular blank 10 of circular cross-section and specifically of cylindrical form made of bendable or deformable material such as metal, as for example, steel, copper and aluminum; the tubular blank can also be made of plastic material, and especially of thermoplastic material, so that it will be deformable upon heating. Other suitable materials may be paper and fibrous material embedded or bonded with plastic.

Figure 12:
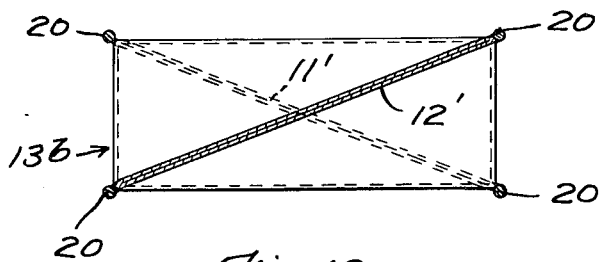
FIG. 12 is a transverse section of a tetrahedral chain core made in accordance with the present invention but showing a modification in which adjacent crimped sections extend at an angle of less than 90° with each other, so that the outline of this transverse section is in the form of an oblong rectangle.

The tubular blank 10 may be welded, glued, seamless or lock-seamed and is crimped at spaced transverse linear sections 11 and 12 in planes at right angles to the axis of the tubular blank to collapse this blank along said sections and to form a structural core or web 13. This crimping operation may be performed while the tubular blank 10 is cold or hot according to the nature of the material from which said blank is formed and may be carried out in such a way that successive sections 11 and 12 are crimped in parallel planes but in different directions and alternate sections 11 or 12 are crimped in parallel planes and in parallel directions. Each of the crimped sections 11 and 12 is produced by collapsing the wall of the tubular blank 10 from diametrically opposite sides of the blank to an equal extent by a pinching action to form each crimped section substantially diametrically across the blank. In the specific form of the invention shown in FIGS. 1–3, the two sets of crimped sections 11 and 12 extend in planes at right angles to each other, so that the transverse general outline of the core is square, as shown in FIGS. 2 and 3. However, the two sets of crimped sections 11 and 12 may extend in planes at an angle other than 90° to each other to define a transverse core outline which is of rectangular oblong shape, as shown in FIG. 12.

Also, in the construction of FIGS. 1–3, the crimped sections are equally spaced and the distances between these sections are such in relation to the diameter of the tubular blank as to form regular tetrahedrons, but as far as certain aspects of the invention are concerned, this is not necessary.

For producing the structural core or web 13, the tubular blank 10 is first crimped in a plane at right angles to the axis of the blank in diametrically opposed directions near one end of the blank to form a first crimped section 11 at the region A and to close the blank; the blank is then crimped at a linear interval from said first crimped section at right angles to the axis of the blank in diametrically opposed directions transverse to the first mentioned directions and more specifically at right angles to said first mentioned directions in accordance with the embodiments of FIGS. 1–3, to form a second crimped section 12 at the region B and to form thereby a hollow tetrahedron 14; and the blank is further crimped at the same linear interval at right angles to the axis of the blank in diametrically opposed directions parallel to the first mentioned directions to form a third crimped section 11 at the region C and thereby a second tetrahedron 15. This crimping action is continued for successive sections in alternate directions until the tubular blank 10 has been shaped into a structural core 13 having the desired configuration. This core 13 will consist of a chain of tetrahedrons 14 and 15 interconnected along the crimp sections 11 and 12 and arranged so that successive tetrahedrons are mirror images of each other in the form of optical antipodes.

Another alternative procedure for forming the tetrahedral chain core or web 13 is to crimp one end of the tubular blank 10 to close said blank. At a linear interval corresponding to two successive tetrahedrons, the blank is crimped in diametrically opposed directions parallel to the diametrically opposed first crimping directions to form a hollow pillow-shaped body between end crimp sections. A third crimp is then formed in the middle of the pillow-shaped body between these crimped sections but in diametrically opposed directions transverse to and specifically at right angles to the first crimping directions, in accordance with the embodiments of FIG. 3. This third crimp deforms the pillow-shaped body into two hollow tetrahedrons 14 and 15.

The tetrahedral chain structure 13 formed as described may be utilized effectively as a basic core or web element of a structure. As shown, each of the tetrahedrons 14 and 15 is bounded by four substantially plane triangular faces 16 and will contain six edges 17, two of which are at opposite ends of the tetrahedron along successive crimped sections 11 and 12 and four vertices located at the ends of these crimp sections to define nodes or peaks 18. These structural nodes 18 are arranged in four parallel linear rows $a$, $b$, $c$ and $d$ extending along the core 13 and encompassing a rectangular area transverse to the core and more specifically a square area, as shown in FIGS. 2 and 3. Ties are secured to these nodes 18 between adjacent tetrahedrons 14 and 15 to form in conjunction with successive triangular plane sections 16 of the tetrahedrons chains of interconnected triangular trusses.

In FIGS. 4 and 5, the ties between the nodes of the core 13 are shown constituting steel rods or wires 20, brazed, welded or otherwise affixed to the core 13 at all nodes 18 in accordance with the nature of the core material, so that these rods or wires constitute parallel chords forming part of the structure unit. These chordal rods 20 serve to further rigidize the core 13 and to form a composite structure unit which may be used, per se, as a structural support, as for example, as a post or beam, or which may be employed as part of a frame or truss.

The composite structure unit 13, 20 constructed as described lends itself admirably for use as a structural element. Although the core of the structure unit 13, 20 has been deformed or prebuckled into a series of continuous tetrahedrons, it is still a tubular structure and still retains the high torsional or twist resistance of a tube. With this characteristic, the composite structure 13, 20 can be employed as a beam even in long spans, without the need of columnar support, whereas with the usual structural elements, such as I-beams, the torsion engendered by long spans necessitates the use of column supports for such spans.

Moreover, the structure 13, 20 of the present invention is isotropic in character. Its plane face sections 16 are equally strong and are oriented in different directions, so that the structure can stand stresses in all directions and will distribute stress applied in any region in all directions.

Also, the composite structure 13, 20 of the present invention is comparatively light and can even be made of material light enough to make the structure buoyant. Moreover, the core structure 13 can be manufactured with ease from tubular stock of from 1/8" diameter to as much as 6" or more in diameter.

The composite unit 13, 20 has an unusually high strength to weight ratio because of the internally continuous braced skin structure and because of the fact that tetrahedrons have the highest ratio of surface area per unit volume of any regular polyhedrons, and consequently are the most stable of all polyhedrons. By combining this property of the tetrahedrons with the high twist resistance of the original tube, there has been created a very stable structure in which stresses are transmitted and resolved continuously in the web or core 13 and the chords 20 in which no points in the structure are ususually stressed.

FIG. 6 shows a modification in which the round tie rods or wires 20 in the construction of FIGS. 4 and 5 are replaced by angle irons 21 serving as chordal ties between nodes 18. These angle irons 21 are snugly rested against the corners of the core 13 and in the case of a metal core may be brazed to the nodes 18 as shown. These angle irons 21 not only contact the core 13 at the nodes 18 but also contact part of the edges 17 of the tetrahedrons 14 and 15 diversing from these nodes, so that stronger connections may be effected between these angle irons and the core by brazing or otherwise securing the angle irons to these contacting parts of the tetrahedral edges.

The angle irons 21 may be welded, adhesively secured or otherwise affixed to the core 13 in accordance with the nature of the core material. For example, as another alternative, studs may be affixed to the nodes 18 by welding or brazing, the angle irons 21 may have holes for impaling the angle irons onto the studs, and nuts may be screwed to the studs to retain the impaled angle irons in position.

FIG. 7 shows a composite structure in which the chordal ties between the nodes 18 are in the form of a pair of parallel strips 22 of sheet material extending along and affixed to the opposing sides of the tetrahedral chain core 13 in the regions where the core and the strips come into contact along the edges of the tetrahedrons 14 and 15, so that the resulting composite unitary 13, 22 will assume the characteristics of an I-beam with the core forming the web and the sheets 22 the flanges.

The strips or sheets 22 may be of steel where the tetrahedral chain core 13 is of steel or other metal, in which case the strips may be brazed onto the core along the regions where the edges 17 of the tetrahedrons 14 and 15 contact said strips, or the strips may be of any other material and may be secured to the core in any other suitable way according to the nature of the material from which the core is constructed.

The composite structure unit 13, 22 formed as described and as shown in FIGS. 6 and 7 may serve as a column, post, beam or part of a frame or truss.

FIG. 8 shows a construction in which the ties are in the form of continuous strips of sheet material extending along all sides of the tetrahedral chain core 13 to enclose entirely the core on all sides and to form thereby a beam or column of rectangular outline. The strips may be in the form of two angles 23 nested against diagonally opposite corners of the core 13 and having their flanges wide enough to extend across the full widths of the core respectively. These angles 23 are brazed, welded or otherwise affixed to the core along the edges of the tetrahedrons 14 and 15 contacting said angles, according to the material from which the core and angles are made.

FIGS. 9 and 10 show a construction in which a plurality of structural cores 13 may be placed side by side in rank formation and rigidly secured together to form a flat structure for use as flooring, platform, pontoon or the like. Flat plates 24 on the top and bottom of the array of structural cores 13, secured to these cores, serve not only as ties for the individual truss elements of the cores but as a means for securing the cores together and as a supporting platform.

The flat plates 24 on the top and bottom of the rank of cores 13 may be the only means by which these cores are held together into a structural unit. In that case, the sides of the cores between the sandwiching plates 24 may be free from attachments. However, to provide a unitary structure in which stresses are more effectively transmitted from core to core, the cores 13 are secured together directly or indirectly.

The cores 13 may not be relatively arranged in rank formation with the tetrahedrons of adjacent cores in transverse registry, so that confronting edges of these tetrahedrons may not be directly in conforming contacting alignment. Such misaligned cores 13 will be in contact only over comparatively small areas and if such cores were directly connected together at these areas, the connections between the cores might not be too strong. To remedy this situation, intervening plates 25 are provided between adjacent cores 13 and the cores are directly connected to these plates by welding or brazing in the case of metal or by any other means in the case of other materials. The cores 13 contact these intervening plates 25 along continuous zig-zag lines constituting the interconnected edges 17 of the tetrahedrons 14 and 15 of these cores in the planes of the plates and are secured to these plates along these lines by welding, brazing or the like, even though adjacent cores may be out of transverse alignment. Firm interconnection of the cores 13 is thereby assured.

If desired, and if a more rigid, stronger and more monolithic structural unit is desired, there may be provided a core retainer 26 of sheet material shaped into rectangular wave form to define a series of rectangular pockets in which the cores are respectively held, as shown in FIGS. 9 and 10. The intervening plates 25 may constitute the upright panel pieces of this retainer 26 and the cores may be connected by welding, brazing or otherwise to all of the panel pieces of this retainer including the plates 24.

The upper sandwiching plate 24 may be depressed inwardly in areas which are not in face contact with any panel pieces of the retainer 26 in accordance with a predetermined repeat pattern, to rigidize this plate and/or for ornamental purposes. Where the cores 13 are not as rigidly secured together, as in the construction of FIGS. 9 and 10, the inward depression of the upper sandwich plate as described will assist in holding the cores against displacement relative to each other and to said sandwiching plate.

One advantage of the core structure so far described is that it can be collapsed, as for example, by rolling to reduce its dimensions to any size within a substantial range without unduly weakening the structure. For example, the structures of FIGS. 7 and 9 could be rolled to reduce the dimensions of the structure between the flanking sheets. The integrated isotropic nature of the core 13 causes the core under the compressive pressures described to collapse distributively over the entire core without local buckling and without failures incident to such localized buckling.

Figure 11:
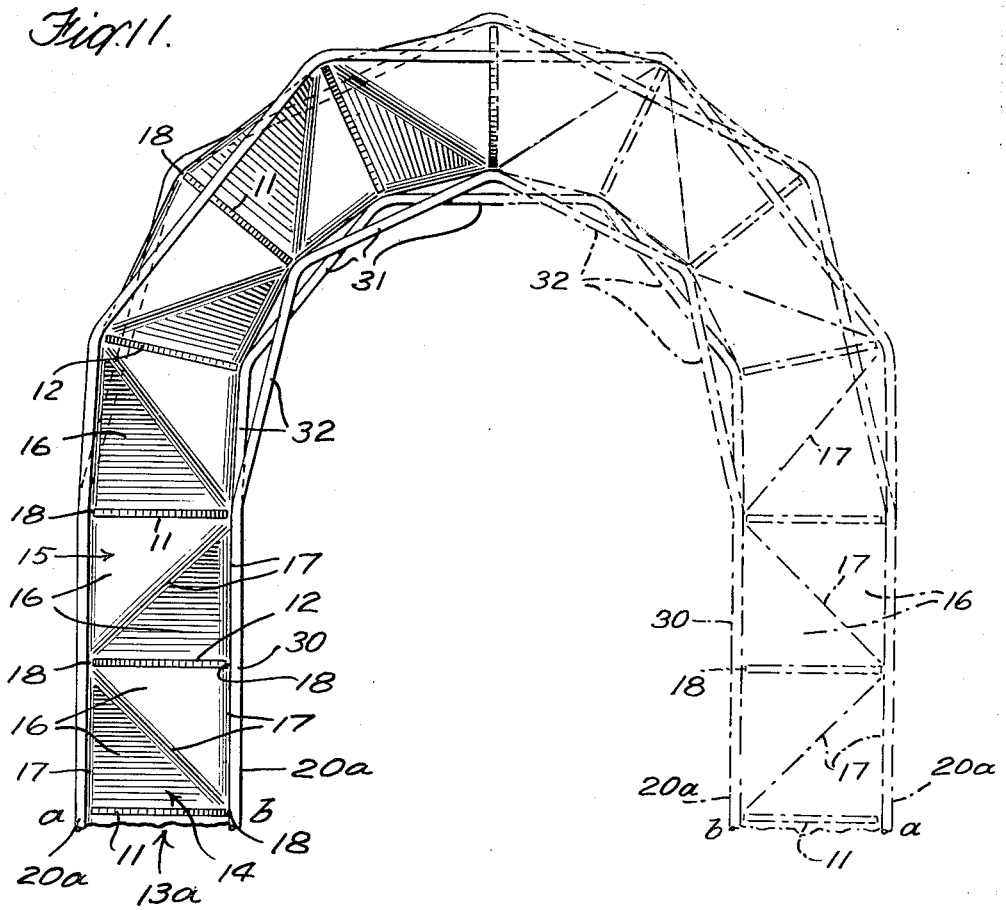
FIG. 11 is a side elevation of a reinforced tetrahedral chain core bent to form an arch in accordance with another embodiment of the present invention.

FIG. 11 illustrates the flexibility of the tetrahedral chain cores of the present invention for structures of different sizes and shape. FIG. 11 shows a core 13a similar to the core 13 described in connection with FIGS. 1–10, but shaped to form the curved skeleton structure for an arch.

The crimped sections 12 and 13 of the tetrahedral chain cores of the present invention form hinges about which the core may be bent into the desired curved shape. In forming an arch structure, the straight core 13 of FIGS. 1–10 is bent around the crimped sections 11 and 12, and this can be effected while maintaining the structural nodes 18 in the rows a, b, c and d (FIGS. 4 and 5) in parallel planes.

Referring to FIG. 11, it is seen that the pier sections 30 of the arched core 13a are straight and correspond to the straight cores 13 of FIGS. 1–5. In these pier sections 30, there are four zig-zag lines of interconnected tetrahedral edges 17 in four flat planes at right angles to each other, two of these lines lying in parallel front and rear planes of the core 13a. The rows a, b, c and d of nodes 18 of the pier sections 30 of the core 13a lie in corresponding flat planes of the tetrahedral edges 17. In the curved section 31 of the arched core 13a between the pier sections 30, the two zig-zag lines of interconnected tetrahedral edges 17 in the front and rear of the core 13a still remain in parallel front and rear planes of the core 13a, while the other two zig-zag lines of interconnected tetrahedral edges 17 between these flat planes will remain in parallel planes at right angles to the flat front and rear planes but will be curved to follow the curved contour of the arch. As a result, the core 13a will maintain a rectangular transverse outline throughout its length similar to the outline shown in FIG. 5.

Four continuous chordal ties are connected to the arched core 13a between nodes 18, these being affixed to the core after said core has been curved into shape. These ties are shown in the form of rods or wires 20a which are similar to the rods 20 in the construction of FIGS. 4 and 5, and which are secured to these nodes 18 by welding or brazing in the case of metal cores or by other means in the case of cores of other materials. Although these tie rods 20a may be continuous, they are straight in the pier sections 30 and form successive chordal elements 32 in the curved section 31 of the core 13a at angles to each other, as shown in FIG. 11.

The arch structure of FIG. 11 may be embedded in concrete or covered with brick or masonry, and thereby may constitute the frame, reinforcement, or stress sustaining structure for a building arch. Also, in place of tie rods 20a, plates may be connected to the faces of the arched core 13a to serve not only as the ties between the nodes of the core but also as coverings for the core.

In the specific form of the invention shown in FIG. 11, the core is shaped for a round arch. The core may also be shaped for a segmental, elliptical and pointed arch; in the latter case, the arch is formed from two separate opposed curvedly converging cores connected together.

FIG. 12 shows a construction similar to that of FIGS. 1–5, except that the crimped sections 11′ and 12′ instead of extending in planes at right angles to each other, extend in planes at an angle other than 90° to each other. As a result, the core 13b instead of having a square transverse outline as in the construction of FIGS. 1–5 has an oblong rectangular outline.

In the specific embodiment of the invention shown the tetrahedral chain core as observed in end view has a generally rectangular transverse outline. However, it may be desirable for architectural, aesthetic or other reasons to have the core shaped of generally polygonal transverse outline having more than four sides. For that purpose, instead of crimping the tubular blank in only two directions as described in connection with the specific embodiments of the invention, the tubular blank is crimped in three or more directions according to the number of sides in the transverse polygonal outline of the core desired, the number of sides being twice the number of directions.

For example, if it is desired to produce a core having a transverse outline of generally equilateral hexagonal shape, the second crimped section is formed 60° from the first crimped section, the third crimped section is formed 120° from the first crimped section and the fourth crimped section is formed in the same direction as the first crimped section, this sequence being repeated according to the length of core desired. The crimped sections formed will be in three planes intersecting along the longitudinal axis of the blank and spaced 60° apart and the resulting tetrahedral chain core of generally hexagonal prismatic form will define six parallel rows of nodes or apices at the corners respectively of the hexagonal outlines. Ties at these nodes will produce a rigid structural unit of generally hexagonal prismatic form.

The tetrahedral chain core of the present invention may be combined with concrete to form a composite structural member where the concrete reinforced by the section of the core embedded in said core serves as the compression resistant element of the member. For example, the core 13 of FIGS. 1–3 may have two ties along the two bottom adjacent rows of nodes 18 and the upper section of the core may not have such ties but may be covered with a wire mesh and filled in with concrete around the upper section of the core up to and a little above said mesh. The resulting structure, for example, may serve as a beam, in which the concrete reinforced by the core acts as the compression part of the beam while the lower section of the core reinforced with the ties serves as the tension part of the beam.

Another application of the tetrahedral chain core of the present invention is its possible use as a standard, stanchion or pole, for use, for example, as a flag pole, or a street, road or stadium light. Such a core may be tapered and formed from a tapering tubular blank. Such a tapering blank may, for example, be made from one-piece hollow extrusions which have been tapered by spinning to form longer poles of uniform wall thickness throughout their length, or by lock-seaming or welding longitudinal joints of formed sheets. Such a tubular blank is collapsed at spaced sections thereof in the manner described to produce a tapering tetrahedral chain core as described. Where the upper section of the core is to be bent to form an overhanging arm as required, for example, in a road or street light, this can be done by hinging the crimped sections as described in connection with the construction of FIG. 11. Thereafter, the necessary ties may be affixed to the nodes of the core.

One of the features of the tetrahedral chain core of the present invention when said core has certain relative dimensions is that the core can be folded about its crimped sections 11 and 12 (FIGS. 2 and 3) by the application of combined compressive stress along the length of the core and torsional stress and can be collapsed, to bring the tetrahedrons 14 and 15 into face to face contact and to produce thereby a structural unit in the form of a triangular prism. For that purpose, the tetrahedral chain core must be made by crimping the tubular blank in a way that the length of tubular blank consumed per tetrahedron is about 1.1 and more specifically 1.111 times the diameter of the tube, as shown in FIG. 13, wherein the tubular blank 10 is shown with the crimping planes e, f, g, h . . . in the designated places along the tubular blank. The crimping of the tube in these planes e, f, g, h . . . in the directions described in connection with the construction of FIGS. 1–3, will produce the straight tetrahedronal chain core 13 shown in FIGS. 14 and 15 similar to that of FIGS. 2 and 3. By applying compressive pressure to the core 13 along its length, and at the same time twisting the ends of the core, as shown by the arrows in FIG. 14, the core will fold about the crimped sections 11 and 12 and collapse into compact cellular form, in which the tetrahedrons are brought together face to face to form a triangular prismatic structure unit 13c, as shown in FIGS. 16, 17 and 18. This collapsing operation may be carried out in successive segments along the core 13 until the entire core or the desired length thereof has been shaped as described.

In the core collapsing operation described, the two contiguous triangular faces of each pair of adjacent tetrahedrons 14 and 15 flanking each crimped section on one side of the section will come together in registering face to face contact, while the two contiguous triangular faces of said adjacent tetrahedrons on the opposite side of said crimped section will open up into coplanar relationship to define conjointly a rhombus constituting a part of the outside surface of the triangular prismatic structural unit produced.

To show more clearly how the tetrahedrons 14 and 15 are folded to produce the prismatic unit 13c of FIGS. 16, 17 and 18, adjacent tetrahedrons in the straight tetrahedral chain core are indicated as 14a, 15a, 14b and 15b, the crimped sections are indicated as 11a, 12a, 11b and 12b, and certain triangular faces of the tetrahedrons are marked 16a, 16b, 16c, 16d and 16e. FIGS. 16, 17 and 18 show the positions of these tetrahedrons, crimped sections and triangular faces, after the core of FIG. 14 has been folded as described.

The tetrahedrons 14 and 15 in the folded prismatic unit 13c can be brazed, soldered or adhesively secured together, as for example, by means of an epoxy resin, at the contacting faces of said tetrahedrons to form a cellular structural unit having unusual buckling resistance and strength characteristics. Where the unit 13c in use is subject to compressive stresses along its length, such connections between the tetrahedrons can be dispensed with. Also, instead of connecting the tetrahedrons at their faces, they may be connected together by longitudinal elements such as rods or angle irons secured by welding, soldering or brazing to the peaks of prism and extending along the prismatic unit.

The prismatic shape of the cellular structure 13c permits a number of these to be arranged compactly side by side, so that the structure is ideally suited to the fabrication of lightweight structural panels, for use for example, in pontoons, platforms, floorings, etc.

While the invention has been described with particular reference to specific embodiments, it is to be understood that it is not to be limited thereto but is to be construed broadly and restricted solely by the scope of the appended claims.

What is claimed is:

1. A structural unit for supporting loads and resisting stresses comprising a tubular member in the form of a chain of integrally interconnected hollow tetrahedrons, and tie means extending between and connected to said tetrahedrons for rendering said unit rigid against relative movements of said tetrahedrons.

2. A structural unit for supporting loads and resisting stresses comprising a tubular member constricted at linear sections transverse to the tubular member substantially closing said member at said sections, and forming a chain of hollow tetrahedrons integrally interconnected at said constricted sections, successive sections extending in different directions and sections at spaced intervals greater than that between successive sections extending in parallel directions, and tie means extending between and connected to said tetrahedrons for rendering said unit rigid against relative movements of said tetrahedrons.

3. A structural unit for supporting loads and resisting stresses comprising a tubular member in the form of a chain of identical integrally interconnected hollow tetrahedrons, adjacent tetrahedrons being mirror images of each other, and tie means extending between and connected to said tetrahedrons for rendering said unit rigid against relative movements of said tetrahedrons.

4. A structural unit in the form of a beam for supporting loads and resisting stresses comprising a core in the form of a chain of integrally interconnected hollow tetrahedrons in series faced on all sides by wall structures, the peaks of said tetrahedrons defining a plurality of nodes extending in rows along the length of the core and chordal ties in the form of elongated elements connected to said nodes to form with side walls of said tetrahedrons a series of triangular trusses.

5. A structural unit for supporting loads and resisting stresses comprising a tubular member constricted at linear sections transverse to the tubular member substantially closing said member at said sections, successive constricted sections extending in nonparallel directions and constricted sections at spaced intervals greater than that between successive sections extending in parallel directions to form a chain of hollow tetrahedrons integrally interconnected at said constricted sections, said unit having a substantially generally geometric transverse outline having four or more sides, the peaks of said tetrahedrons defining a plurality of parallel rows of nodes along the tubular member at the corners respectively of said outline, and chordal ties secured to said nodes to form with side walls of said tetrahedrons a series of triangular trusses.

6. A structural unit as described in claim 5, wherein said ties are in the form of rods.

7. A structural unit as described in claim 5, wherein said ties are in the form of angle irons nested against the corners of said outline.

8. A structural unit as described in claim 5, wherein said ties are in the form of plates secured to the sides of the tubular member.

9. A structural unit as described in claim 5, wherein plates are secured to all sides of the tubular member respectively to enclose said tubular member.

10. A structural unit as described in claim 5, said tubular member being of metal, the constricted linear sections of the tubular member consisting of opposed parts of the tubular member in contact with each other to close entirely said member at said constricted sections.

11. A structure for supporting loads and resisting stresses comprising a plurality of tubular members, each constricted at linear sections transverse to the tubular member substantially closing said member at said sections, and forming a chain of hollow tetrahedrons integrally interconnected at said constricted sections, successive sections extending in different directions and alternate sections in parallel directions, said tubular members being connected together in array side by side, and a pair of parallel plates on opposite sides of said array of tubular members secured to said tubular member to form a panel structure.

12. A structural unit for supporting loads and resisting stress comprising a tubular member constricted at linear sections transverse to the tubular member substantially closing said member at said sections and forming a chain of hollow tetrahedrons integrally interconnected at said constricted sections, said tubular member being bent about certain of said constricted sections, said tubular member if straightened about said certain constricted sections would have successive constricted sections extending in different directions and alternate constricted sections extending in parallel directions, and tie means extending between and connected to said tetrahedrons for rendering the bent unit rigid against relative movements of said tetrahedrons.

13. A structural unit as described in claim 12, wherein said tubular member is bent in the shape of an arch.

14. A structural unit as described in claim 12, wherein said tubular member is bent in the shape of an arch, the peaks of said tetrahedrons defining a plurality of nodes extending in rows along the length of the arch, and wherein said tie means includes chordal ties connected to said nodes to form with side walls of said tetrahedrons a series of triangular trusses.

15. A structural unit for supporting loads and resisting stresses comprising a tubular member constricted at linear sections transverse to the tubular member substantially closing said member at said sections and forming a chain of hollow tetrahedrons integrally interconnected at said constricted sections, said tubular members being folded about said constricted sections so that each pair of successive tetrahedrons have a pair of contiguous triangular faces respectively in face to face contact, and another pair of contiguous triangular faces respectively extending in substantially coplanar relationship, said tubular member being substantially in the form of a triangular prism, and means for rigidly securing said tetrahedrons in face to face contact against relative movements.

16. A structural unit as described in claim 15, wherein said tubular member if extended into straightened condition and transversely extended would be a cylindrical tube the distances between the planes of constriction being equal to approximately 1.1 times the diameter of said tube.

References Cited by the Examiner

UNITED STATES PATENTS

| 600,759 | 3/1898 | Williams. | |
| 1,318,210 | 10/1919 | Bioteaux | 257—262.23 X |
| 1,740,053 | 12/1929 | Wehr | 189—37 |
| 1,997,022 | 4/1935 | Stalker | 46—1 |
| 2,244,847 | 6/1941 | Oeckl et al. | 29—155 |
| 2,392,674 | 1/1946 | Lachman et al. | 189—37 |
| 2,481,046 | 9/1949 | Scurlock | 189—34 |
| 3,022,886 | 2/1962 | Jarnhall | 206.56 |
| 3,104,454 | 9/1963 | Handley et al. | 29—155 |

FOREIGN PATENTS

| 24,998 | 11/1922 | France. |
| | | (Addition to No. 543,165) |
| 842,318 | 6/1939 | France. |

FRANK L. ABBOTT, *Primary Examiner.*

JOEL REZNEK, RICHARD W. COOKE, Jr., JACOB L. NACKENOFF, *Examiners.*